US010114998B2

United States Patent
Amir et al.

(10) Patent No.: US 10,114,998 B2
(45) Date of Patent: *Oct. 30, 2018

(54) SECURITY FEATURE

(71) Applicant: HP INDIGO B.V., Amstelveen (NL)

(72) Inventors: Gideo Amir, Nes Ziona (IL); Dror Kella, Nes Ziona (IL); Matthew D. Gaubatz, Bellevue, WA (US)

(73) Assignee: HP Indigo B.V., Amstelveen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/994,677

(22) Filed: Jan. 13, 2016

(65) Prior Publication Data

US 2016/0253537 A1    Sep. 1, 2016

Related U.S. Application Data

(63) Continuation of application No. 14/397,417, filed as application No. PCT/US2012/047456 on Jul. 19, 2012, now Pat. No. 9,268,986.

(51) Int. Cl.
*G06K 7/14* (2006.01)
*G06K 19/06* (2006.01)
*G06K 1/12* (2006.01)

(52) U.S. Cl.
CPC ........... *G06K 7/1443* (2013.01); *G06K 1/121* (2013.01); *G06K 7/1417* (2013.01); *G06K 19/06037* (2013.01)

(58) Field of Classification Search
CPC .... G06K 7/1443; G06K 7/1417; G06K 1/121; G06K 19/06037
See application file for complete search history.

(56) References Cited

U.S. PATENT DOCUMENTS

| 7,444,000 B2 | 10/2008 | Rhoads |
| 7,555,139 B2 | 6/2009 | Rhoads et al. |
| 7,798,403 B2 | 9/2010 | Tiller et al. |
| 8,001,897 B2 | 8/2011 | Gretsch |
| 2004/0164155 A1 | 8/2004 | Iwaguchi et al. |
| 2007/0171439 A1 | 7/2007 | Kakutani |
| 2008/0099562 A1 | 5/2008 | Kim |

(Continued)

FOREIGN PATENT DOCUMENTS

| AU | 2009201463 A1 | 11/2010 |
| CN | 1595440 | 3/2005 |

(Continued)

OTHER PUBLICATIONS

International Search Report and Written Opinion dated Mar. 11, 2013 issued on PCT Patent Application No. PCT/US2012/047456 dated Jul. 19, 2012, Korean Intellectual Property Office.

(Continued)

*Primary Examiner* — Sonji Johnson
(74) *Attorney, Agent, or Firm* — HP Inc. Patent Department

(57) ABSTRACT

According to one example, there is provided a method of generating a security feature that encodes data. The method comprises obtaining an n-bit code of data to encode, generating an arrangement of dots, designating a first portion of the dots as reference dots and a second portion of the dots as encoding dots, and moving a group of the designated encoding dots by a predetermined direction in a predetermined amount to encode the n-bit code of data.

15 Claims, 8 Drawing Sheets

(56) References Cited

U.S. PATENT DOCUMENTS

2008/0101693 A1   5/2008   Young et al.
2009/0125724 A1   5/2009   Lapstun et al.
2010/0060942 A1   3/2010   Monga et al.

FOREIGN PATENT DOCUMENTS

| CN | 1926506 | 3/2007 |
| EP | 1605395 | 12/2005 |
| KR | 20100061563 A | 6/2010 |
| WO | WO-2008/084886 A1 | 7/2008 |

OTHER PUBLICATIONS

Molloy, I., et al., Attack on the Gridcode One-time Password, pp. 306-315, 2011. <http://delivery.acm.org/10.1145/1970000/1966953/p306-molloy.pdf?ip=203.8.109.15&aco=ACTIVE20SERVICE&CFID=86686034&CFTOKEN=64297714&_acm_=1339055711_8e2b231fa1ec451921b78eb2a1873d0e>.

European Patent Office. Supplementary European Search Report. dated Oct. 26, 2015. Application No. 12881397.9.

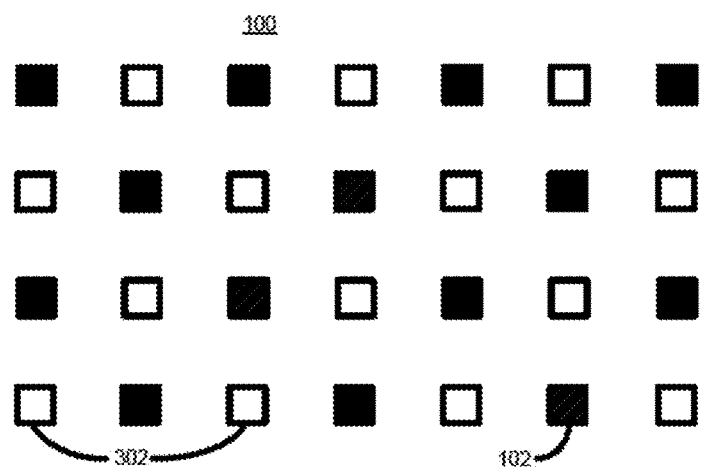
FIG. 3
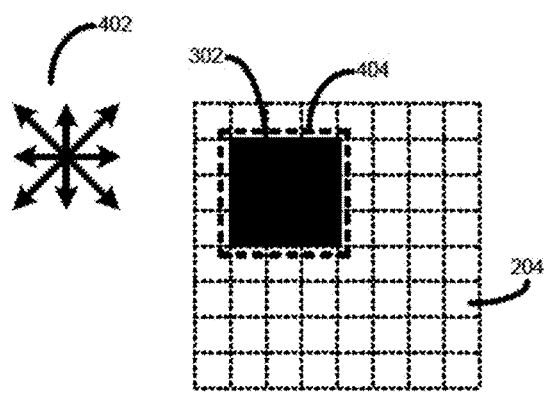
FIG. 4
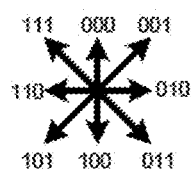 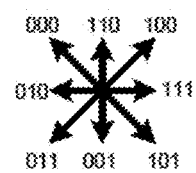
FIG. 5A         FIG. 5B

SECURITY FEATURE

PRIORITY

This application is a Continuation of commonly assigned and co-pending U.S. patent application Ser. No. 14/397,417, having a filing date of Oct. 27, 2014, which is a national stage filing under 35 U.S.C 371 of PCT application number PCT/US2012/047456, having an international filing date of Jul. 19, 2012, the disclosures of which are hereby incorporated by reference in their entireties.

BACKGROUND

Many goods, such as pharmaceuticals, consumer electronic goods, replacement car parts, to name just a few examples are frequently counterfeited. Counterfeited goods are generally of inferior quality to original goods, and may in many instances be dangerous. Often, however, counterfeited goods are difficult to tell apart from original goods.

When consumers inadvertently purchase counterfeited goods harm may be caused to the goodwill and reputation of the brand of the goods. Physical harm may also be caused to the consumers or devices in which counterfeited goods are used.

Security features, such as security labels are commonly used to help consumers identify original goods from counterfeited goods. An effective security feature should be difficult to reproduce by a counterfeiter, and should allow a user to quickly and confidently identify authentic original goods.

BRIEF DESCRIPTION

Examples, or embodiments, of the invention will now be described, by way of non-limiting example only, with reference to the accompanying drawings, in which:

FIG. 3 is close-up illustration of a ion of a security feature according to one example;

FIG. 4 is an illustration showing how a dot of a security feature may encode data according to one example;

Figure 6:
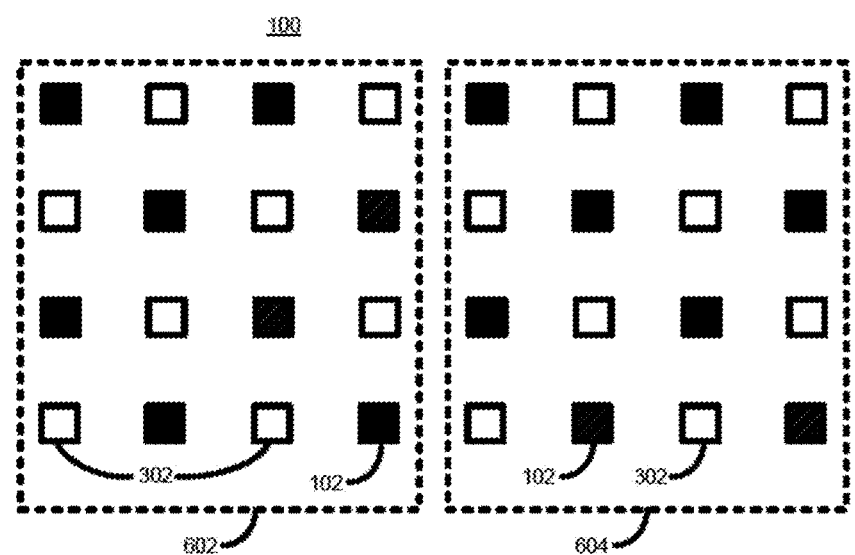
Figure 7:
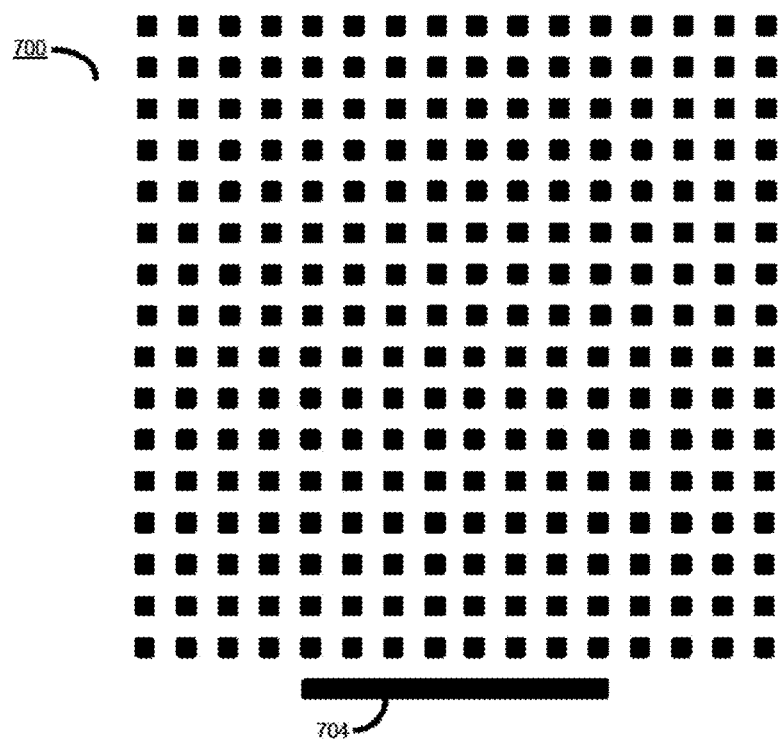
Figure 8:
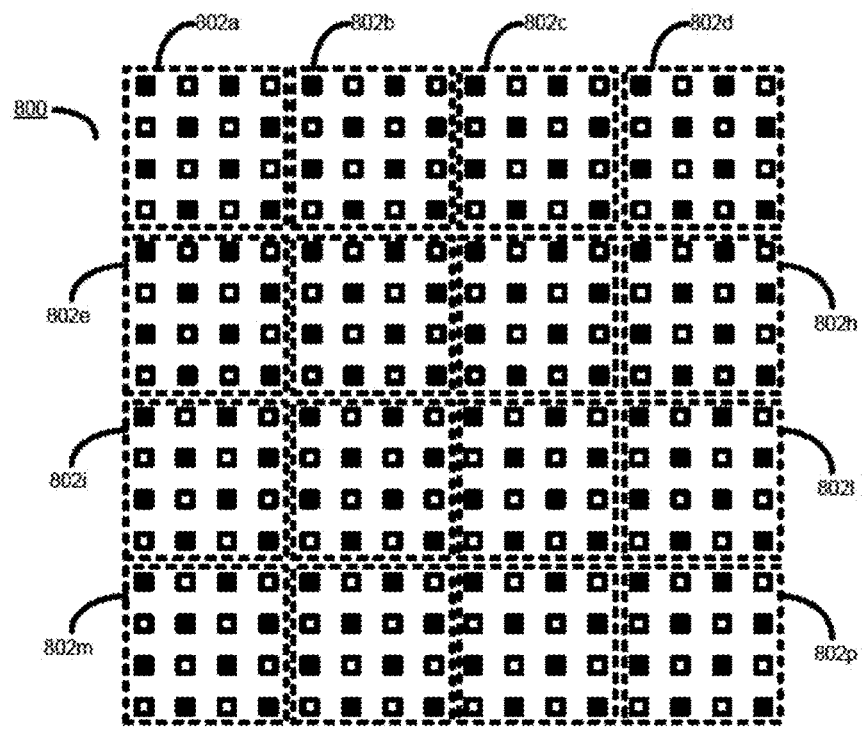
Figure 9:
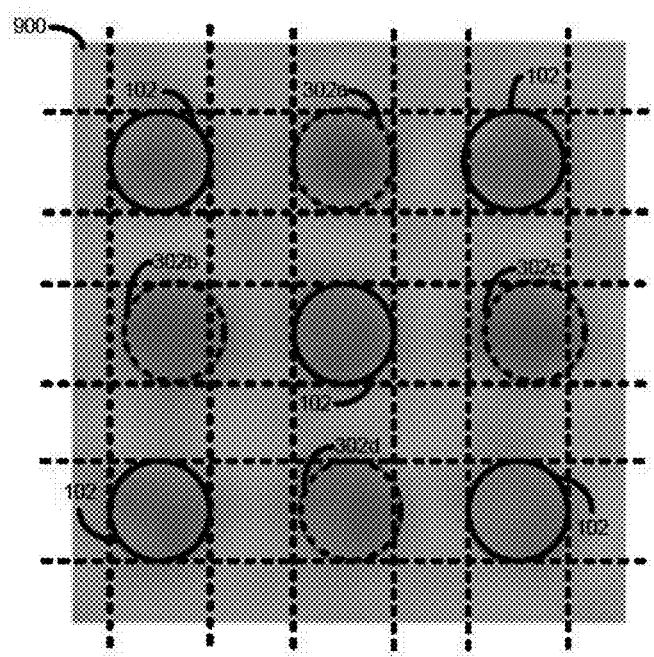
Figure 10:
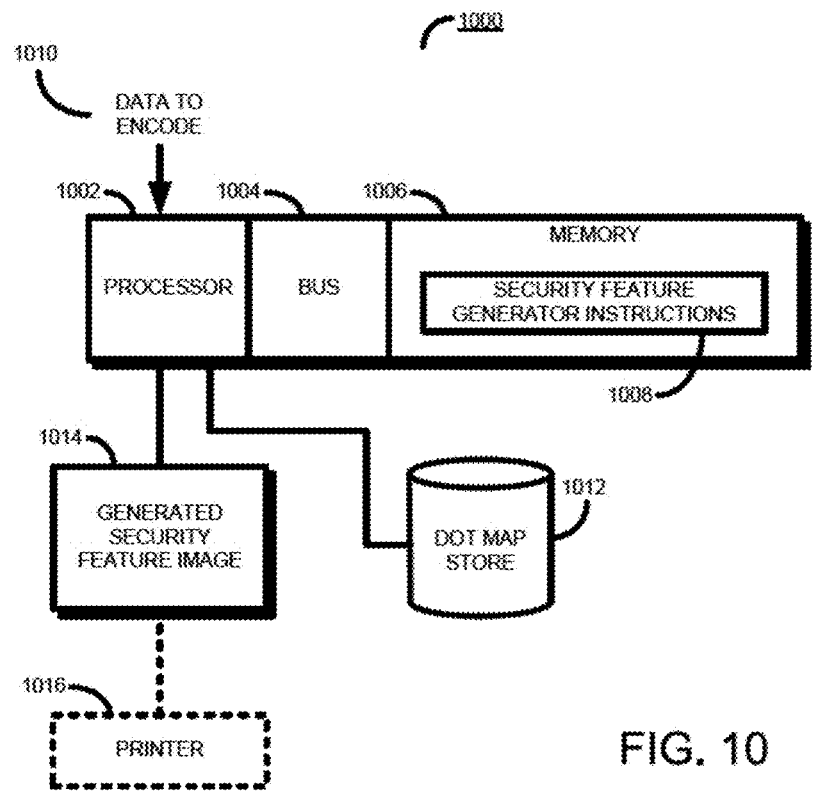
Figure 11:
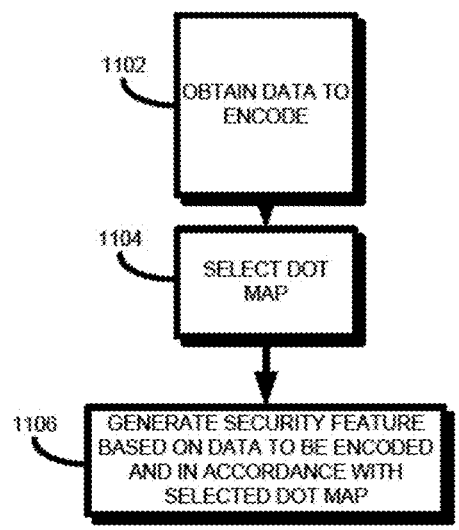
Figure 12:
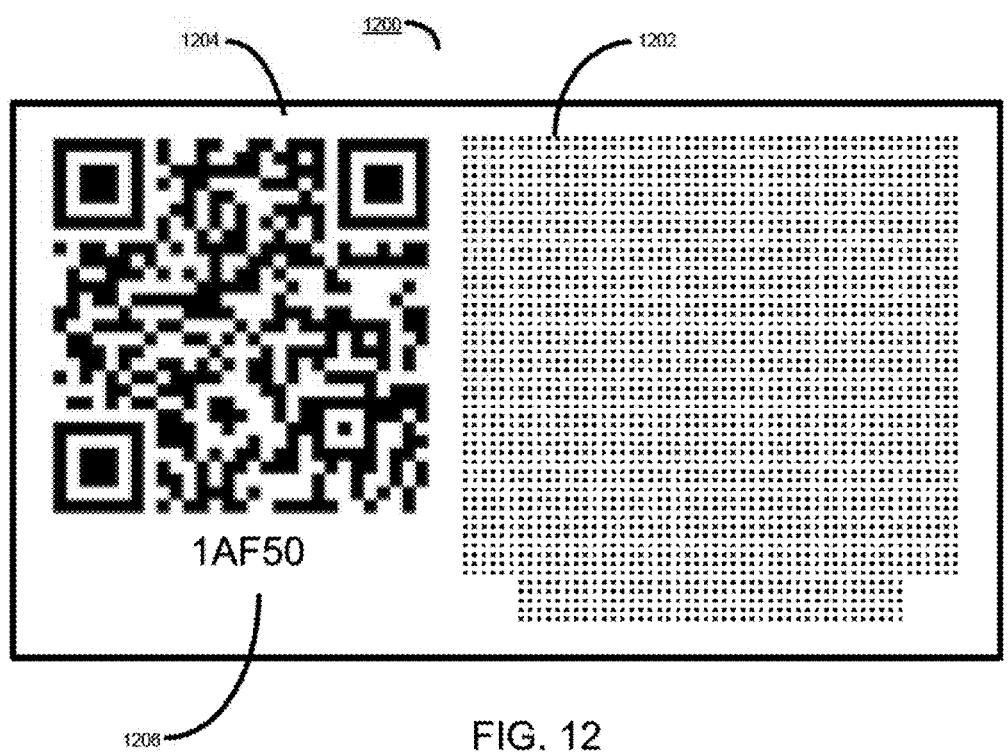
Figure 13:
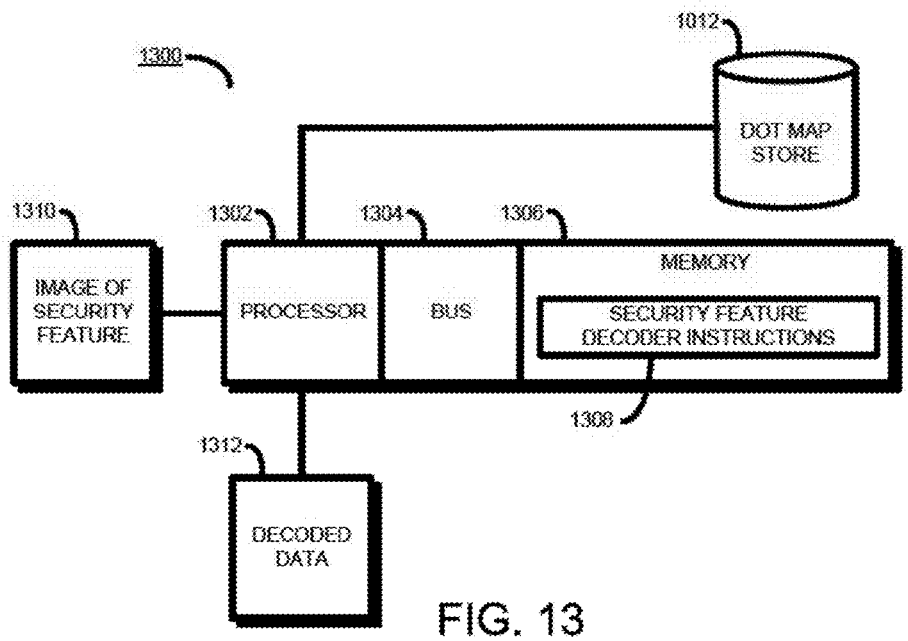
Figure 14:
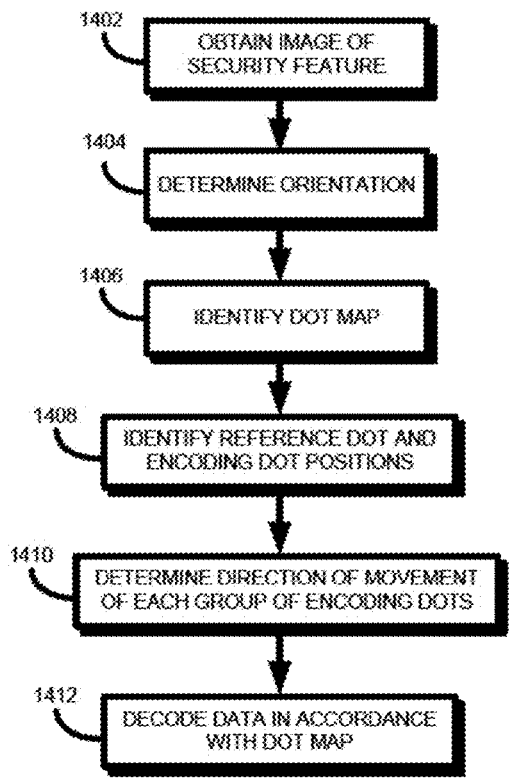

FIGS. 5A-B are illustrations of encoding schemes according to some examples;

FIG. 6 is an illustration of a portion of a security feature according to one example;

FIG. 7 is an illustration of a security feature according to one example;

FIG. 8 is an illustration of a dot map according to one example;

FIG. 9 is a close up of a photographic image of a portion of a security feature according to one example;

FIG. 10 is a block diagram showing a system to generate a security feature according to one example;

FIG. 11 is a flow diagram outlining an example method generating a security feature according to one example;

FIG. 12 is an illustration of a security feature according to one example;

FIG. 13 is a block diagram showing a system to decode data encoding in a security feature according to one example; and FIG. 14 is a flow diagram outlining an example method of decoding data encoded in a security feature according to one example.

DETAILED DESCRIPTION

In accordance with the various examples described herein, a security feature is provided. In some examples, a security feature is provided that is difficult or impossible to duplicate using standard printing equipment, such as inkjet printing systems and dry toner laser printing systems. In some examples, a security feature is provided that encodes data in way that makes it very difficult for unauthorized parties to determine the data encoded in the security feature. In some examples, a security feature authentication system is provided to enable a consumer to determine whether a security feature is authentic.

Figure 1:
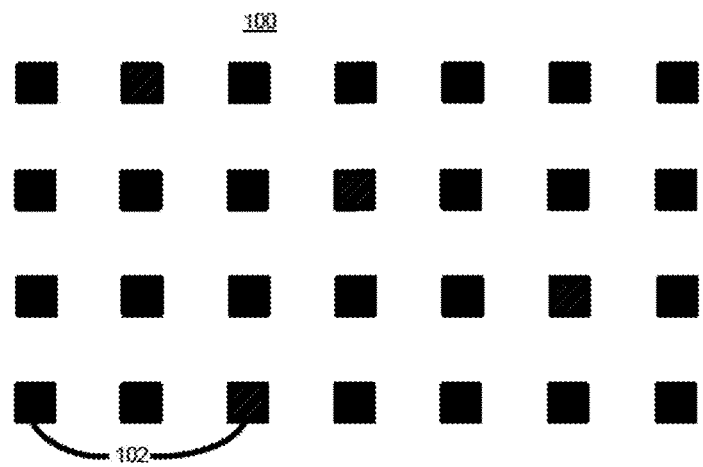
FIG. 1 is an illustration of a security feature according to one example.

Referring now to FIG. 1 there is shown an illustration of a security feature 100 according to one example. The security feature 100 may be printed to provide a printed security feature, for example as part of a printed security label.

The security feature 100 comprises an arrangement of dots 102. In the present example the dots 102 are square in shape. In other examples, however, other shape dots may be used, such as circular dots, rectangular dots, triangular dots, cross-shaped dots, or any other suitable geometric or non-geometric shape or form dots. In one example dots are solid filled, and in other examples the dots may be unfilled. The term 'dot' used herein is intended to encompass any suitable dot shape.

The dots 102 are arranged in a predetermined arrangement. In the present example the dots are arranged as a two-dimensional array of dots, where each dot is equally spaced from other horizontally and vertically neighbouring dots. As will become apparent from the description below, however, some of the dots 102 may be moved such that they are only substantially equally spaced from other horizontally and vertically neighbouring dots.

The number of dots in any security feature may vary, as will also become apparent below.

In other examples other arrangements of dots may be used, such as a radial arrangement of dots, or any other suitable arrangement.

Figure 2:
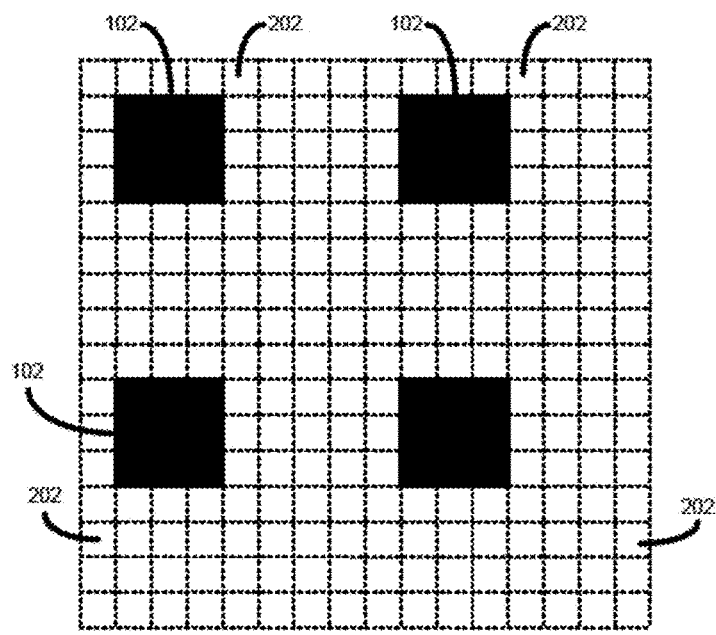
FIG. 2 is a close-up view of a portion of a security feature according to one example.

Referring now to FIG. 2 a close-up view of a portion of the arrangement of dots 100 in which a number of dots 102 are shown. Each dot 102 is comprised of a two-dimensional array measuring three pixels by three pixels. In the present example the term pixel is the smallest size of ink mark that may be generated by a printing system used to print the security feature 100. In the present example the security features described herein may be printed with a Hewlett-Packard Indigo press using liquid electro-photographic (LEP) ink, also known as ElectroInk. In the present example each pixel 202 measures about 33 microns by 33 microns, hence each dot 102 measures about 100 microns by 100 microns.

In the present example each dot 102 is separated from its nearest vertical and horizontal neighbor by a distance of 5 pixels. In other examples, however, other greater or smaller spacings may be used.

In other examples the security features described herein may be printed using other printing technology, and hence the sizes described herein may be adjusted depending on the printing technology used.

In other examples, other dimensions for each dot 102 and each pixel 202 may be used. However, at larger sizes it will be easier to reproduce the security feature 100 using widely-available printing and reproduction equipment, such as inkjet printers and dry toner laser printers.

The arrangement of dots 100 is used to encode data as will be described below.

As shown in FIG. 3, a first portion of dots of the arrangement of dots 100 are designated or selected to be modifiable to encode data. By modifiable is meant that their position is moveable from a notional predetermined default position relative to at least one reference dot. These designated dots, shown as dots 302 in FIG. 3, are hereinafter referred to as encoding dots.

A second portion of dots of the arrangement of dots 100 are designated as reference dots. Unlike encoding dots, reference dots are not moveable, and hence serve as a reference position to one or more encoding dots.

It should be noted that in FIG. 3 encoding dots are shown in an outline (i.e. not filled) for reasons of clarity. When printed, however, encoding dots 302 and reference dots 102 are indistinguishable from one another.

As illustrated in FIG. 4, an encoding dot 302 may be moved from a notional default position to encode data. In one example an encoding dot is movable by a predetermined amount in a predetermined direction to encode an n-bit code or word of data. In one example an encoding dot may be moved a fixed amount in one of eight different directions 402 (e.g. 0°, 45°, 90°, 135°, 180°, 225°, 270°, and 315°), thereby enabling an encoding dot 302 to encode a 3-bit code depending on the direction in which it is moved.

In one example the amount by which an encoding dot may be moved in any of the defined directions is about ⅓ of a pixel 204, as shown by the dotted zone 404. In one example, when using Hewlett-Packard Indigo presses, ⅓ of a pixel represents a distance of about 10 microns.

In one example an additional 1 bit of data may be encoded by not moving an encoding dot 302—i.e. by leaving a dot in its notional default position.

In other examples, an encoding dot may be moved in one of 8 different directions by one of two fixed amounts. This enables each encoding dot to encode a 4-bit code. In other examples, an encoding dot may be moved in a greater or lesser number of directions and may be moved by one or multiple predetermined amounts to encode a different amount of data.

FIG. 5A shows an example of a coding scheme according to one example. To encode the binary number '000' an encoding dot is moved by a fixed amount in a vertical direction (i.e. 0°), to encode a binary '001' an encoding dot is moved by a fixed amount in a direction of 45° to the vertical, and so on.

Since each encoding dot is moved relative to other fixed reference dots, this enables the direction in which an encoding dot was moved to be easily determined. For example, image analysis of a photograph or a scan of a printed arrangement of dots 100 enables the direction of each encoding dot to be determined, and hence the data encoded by each encoding dot to be determined.

One aim of the present examples is to enable data encoded by a security feature in accordance with examples described herein to be determinable from image analysis of photographic images taken using readily available photographic devices, such as digital cameras incorporated into consumer smartphones, mobile telephones, or other portable communication devices. Images obtained using such photographic devices are generally fairly low in resolution (for example, less than 8 megapixels) and generally do not have the same high-quality optics found in dedicated digital cameras.

Since the amount by which each encoding dot is moved to encode data is very small (around 10 microns in one example) this makes it difficult to accurately determine the direction a single encoding dot was moved relative to a reference dot using low-resolution and noisy images.

To facilitate decoding, as shown in FIG. 6, in one example each 3-bit code is encoded by multiple encoding dots 302. For example, in FIG. 6 each of the eight encoding dots 302 shown in zone 602 are used to encode the same 3-bit code—i.e. each of the encoding dots 302 shown in zone 602 are moved by the same amount and in the same direction according to the encoding scheme. Similarly, another 3-bit code is encoded by the group of eight encoding dots 302 shown in zone 604.

In this example, as shown in FIG. 6, each of the encoding dots used to encode a single 3-bit code are grouped together in close proximity to one another. However, in other examples the encoding dots used to encode the same 3-bit code may be distributed throughout the arrangement of dots in any predetermined pattern. In the present example each 3-bit code is encoded using 8 different encoding dots, however in other examples a greater or smaller number of encoding dots may be used to encode the same 3-bit code.

In one example, to further enhance security of the security feature, different encoding schemes may be used for each group of encoding dots. For example, a first group of encoding dots may be encoded according to the encoding scheme shown in FIG. 5A, and a second group of encoding dots may be encoded according to an encoding scheme shown in FIG. 5B.

Accordingly, to decode the data encoded in a security feature a decoder has to know which of the arrangement of dots are reference dots, which of the dots are encoding dots, which groups of encoding dots are used to encode each n-bit code, and which encoding scheme is used for each group of encoding dots. This information may be provided, for example, in a dot map. In some examples, different security features may have different dot maps.

Referring now to FIG. 7 is shown an illustration of a printed security feature 700 according to one example. The security feature comprises multiple reference dots and multiple encoding dots. At the scale shown in FIG. 7 it is not discernible which of the dots are encoding dots that have been moved relative to other reference dots.

In the example shown in FIG. 7, an orientation feature 704 is included in the security feature. In this example the orientation feature is a printed line, although in other examples other orientation features may be used. The orientation feature 704 is used to enable a decoding application to orientate a photographic image of the security feature relative a reference orientation. Once the photographic image of the security feature has been correctly orientated decoding of the data encoded therein may be performed with reference to associated dot map.

In the example shown in FIG. 7, the security feature 700 has a known associated dot map 800 illustrated in FIG. 8. As illustrated, in this example a first 3-bit code is encoded with 8 encoding dots in a first zone 802a, a second 3-bit code is encoded with 8 encoding dots in a second zone 802b, and so on. In the example illustrated in FIG. 8 a 48-bit code may be encoded.

In other examples, a printed security feature may additionally include a dot map identifier to identify its associated dot map data. In one example a dot map identifier may be a printed numerical, alphabetic, or alpha-numeric code, an n-dimensional bar code, or any suitable visual identification means. In one example the shape of the security feature is used to identify a dot map and its associated dot map data.

To decode a code encoded in a security feature as described herein a photographic image of the security feature is analysed to determine the position of the dots comprising the security feature. FIG. 9 shows a close-up view of an image showing a portion of a security feature. The position of each of the dots visible in the security feature have been determined using a suitable image analysis procedure. For example, the centre of mass of each dot may be determined analytically, and the border of each dot determined. Using the dot map data associated with the security feature enables the position of each reference dot 102 to be determined, and the position of each encoding dot, as well as the direction in which each encoding dot has been moved, may be determined relative to one or more reference dots. This may be achieved, for example, by overlaying a regularly spaced grid aligned with each of the reference dots 102.

As illustrated in FIG. 9 it is clear that the encoding dots 302a to 302d have been moved to the right relative to their notional default position. Even though the amount of movement is small, an accurate determination of the direction of movement may be determined, for example, by averaging the direction of movement of each encoding dot in a group of encoding dots. Hence, as shown in FIG. 9, although from the individual encoding dot 302a the direction in which it was moved it is not clear (for example due to imaging errors, noise, printing inaccuracies, missing dots, media deformation, etc.), it becomes clear when taking into account each of the encoding dots 302a to 302d. The data encoded by a group of encoding dots may be determined once the direction in which the group of encoding dots was moved has been determined.

Referring now to FIG. 10 there is a shown a system 1000 for generating a security feature in accordance with an example. Operation of the system 1000 is described with additional reference to the flow diagram of FIG. 11.

The system 1000 comprises a processor 1002 coupled to a memory 1006 via a communications bus 1004. The memory 1006 stores processor understandable instructions 1008 that, when executed by the processor 1002, cause the processor 1002 to generate a security feature as described herein.

At block 1102 the processor 1002 obtains some data to encode 1010. The data to encode 1010 may be input, for example, to the processor 1002 through a suitable user interface (not shown), obtained from a memory, or in any suitable manner.

In the present example the system 1000 is configured to generate an image 1014 of a security feature having 256 encoding dots and 256 corresponding reference dots. Each encoding dot may encode a 3-bit code, and each 3-bit code is encoded by a group of 8 encoding dots. This arrangement enables 96 bits of data to be encoded by the security feature (i.e. 256*3/8).

In other examples a security feature may have a greater or smaller number of encoding dots. In other examples each encoding dot may encode a different size n-bit code. In other examples each n-bit code may be encoded by a group of K encoding dots, where K is greater or smaller than 8. In other examples a security feature may have a smaller number of reference dots to encoding dots—in other words a reference dot may act as a reference point for multiple encoding dots.

At block 1104 the processor selects a dot map to be used to encode the data to be encoded 1010. In one example a standard dot map may be selected in which case no dot map identifier will have to be added to the generated security feature image 1014. In another example a pre-defined dot map may be selected from a dot map store 1012. In a further example a randomised, or pseudo-randomised, dot map data may be generated and stored in the dot map store 1012 along with an allocated dot map identifier. Where a dot map stored in the dot map store 1012 is selected an identifier identifying the selected dot map is added to the image 1014 of the generated security feature, in any suitable manner, to enable a decoder to know how to decode the data encoded therein.

The dot map store 1012 stores, for each identified dot map, at least some of the following dot map data: the location of reference dots; the location of encoding dots; the location of each group of encoding dots encoding each n-bit code; the encoding scheme by each group of encoding dots to encode each n-bit code.

At block 1106 the processor generates a security feature by encoding the data to be encoded 1010 according to the selected dot map, as described above.

The image of the generated security feature 1012 may then be printed, for example, using a printing system such as a Hewlett-Packard Indigo press 1016.

The system 1000 may be used to print large numbers of security features, for example incorporated into product labels or as separate security features to be stuck to or included with a product. In one example the system 1000 is configured such that each printed security feature encodes different data. In one example the system 1000 is configured such that different printed security feature use different dot maps. In one example the system 1000 is configured such that different printed security features encode different data and use different dot maps.

An example security feature generated by the system 1000 is shown in FIG. 12. The security feature 1200 comprises an arrangement of dots 1202 comprising reference dots and encoding dots. The shape of the arrangement of dots 1200 enables the orientation of the arrangement of dots to be determined by a decoder. The security feature 1200 additionally comprises a 2-dimensional bar code 1204 that encodes data that may be used by a decoder to decode the data encoded by the arrangement of dots 1202. The 2-dimensional data may encode, for example, a dot map identifier. The security feature 1200 additionally includes a human readable identifier 1206 that may be used, for example, to enable a decoder to identify a dot map and associated dot map data to be used to decode the data encoded by the arrangement of dots 1202.

Turning now to FIG. 13, there is shown a system 1300 for decoding data encoded in a security feature generated using the system 1000. Operation of the system 1300 is described with additional reference to the flow diagram of FIG. 14.

The system 1300 comprises a processor 302 coupled to a memory 1306 via a communications bus 1304. The memory 1306 stores processor understandable instructions 1308 that, when executed by the processor 1302, cause the processor 1302 to decode data stored in a security feature as described herein.

At block 1402 the processor 1302 obtains an image 1310 of a security feature. As previously described, the image 1310 may have been obtained with a low resolution or low quality digital camera, such as a digital camera integrated into a smartphone.

In one example the image 1310 may be obtained through use of a dedicated security feature analysis application running on a smartphone. In this example upon taking a photograph of a security feature the image is transmitted remotely to the system 1300 which decodes the data encoded in the security feature in the image 1310.

At block 1404 the processor analyses the image to determine the orientation of the security feature in the image 1310. As previously mentioned, this may be achieved by analyzing the shape of the arrangement of dots in the security feature, by detection of an alignment feature, or in any suitable manner.

At block 1406 the processor 1302 analyses the image to identify a dot map used to encode the data in the security feature. In one example the dot map is identified by way of a dot map identifier included in the security feature, such as a printed numerical, alphabetic, or alpha-numeric code, an n-dimensional bar code, or any suitable visual identification means. In one example the shape of the security feature is used to identify a dot map.

At block 1408 the processor 1302 determines, based on the identified dot map and through access to the dot map store 1012 at least some of the following data: the location of reference dots; the location of encoding dots; the location of each group of encoding dots encoding each n-bit code; and the encoding scheme used to encode each n-bit code.

At block 1410 the processor 1302 analyses the image 1310 to determine, based on the identified dot map, the direction each group of encoding dots is displaced, relative their notional default position, and hence the n-bit code encoded thereby.

At block 1412 the processor 1302 obtains the data encoded in the image 1310 with reference to the identified dot map.

In one example the decoded data may have been previously associated with product data stored in a product database (not shown). In this example the system 1300 may return to the smartphone or web application details of the product associated with the decoded data, such as a product description, a product serial number, etc. to enable a user to determine whether the product is genuine.

One of the reasons for printing security features as described herein using Hewlett-Packard indigo presses using liquid electro-photographic (LEP) ink is that other common digital printing systems, such as inkjet and dry-tone laser printing system are unable to print at comparable resolutions with comparable dot accuracy. Accordingly, this makes reproducing security features as described herein difficult unless access to specialized printing technology is available. Although similar printing resolution and accuracy may be achieved using traditional offset printing techniques such techniques are generally only accessible to large-scale printer providers. Furthermore, traditional offset techniques do not enable variable printing data, and hence does not allow each printer security feature to be unique or substantially unique.

A further advantage of the security feature as described herein is that the security feature is printed using only a single colour, such as black. This enables the security feature to be printed at low cost.

Examples described herein provide a way of encoding data into a security feature comprising an arrangement of printed dots such that the data encoded therein may be decoded and used to determine whether the security feature is authentic or has been tampered with. By attaching such a printed security feature to a goods item enables a consumer to verify whether the goods item is an authentic goods item or a counterfeit.

In a yet further example, a generated security feature may not be printed but may be displayed. For example on an electronic display device such as a computer monitor, a mobile telephone screen, or the like.

It will be appreciated that examples and embodiments of the present invention can be realized in the form of hardware, software or a combination of hardware and software. As described above, any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples of the present invention. Examples of the present invention may be conveyed electronically via any medium such as a communication signal carried over a wired or wireless connection and examples suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A method of generating a security feature, the method comprising:
   obtaining an n-bit code of data to encode;
   generating an arrangement of dots;
   designating a first portion of the dots as reference dots and a second portion of the dots as encoding dots, wherein the reference dots are unmovable and the encoding dots are movable; and
   moving one of the encoding dots by a predetermined amount in a predetermined direction to encode the n-bit code of data.

2. The method of claim 1, wherein the n-bit code of data is a 3-bit code of data, and
   wherein moving one of the encoding dots includes moving the encoding dot in one of eight directions relative a default position to encode the 3-bit code of data.

3. The method of claim 2, wherein the eight directions include 0°, 45°, 90°, 135°, 180°, 225°, 270°, and 315° relative to the default position, and wherein each of the eight directions corresponds to one of eight numbers of a 3-bit code.

4. The method of claim 1, wherein moving one of the encoding dots by a predetermined amount includes moving the encoding dot by ⅓ of a pixel in the predetermined direction to encode the n-bit code data.

5. The method of claim 1, further comprising:
   recording, in a dot map identifier, locations of the reference dots within the arrangement of dots, locations of the encoding dots within the arrangement of dots, and a location of the encoding dot encoding the n-bit code of data.

6. A non-transitory computer readable storage medium storing instructions that when executed by a processor cause the processor to generate a security feature, wherein, to generate the security feature, the instructions cause the processor to:
   obtain an n-bit code of data to encode;
   generate an arrangement of dots;

designate a first portion of the dots as reference dots and a second portion of the dots as encoding dots, wherein the reference dots are unmovable and the encoding dots are movable; and move one of the encoding dots by a predetermined amount in a predetermined direction relative to a default position to encode the n-bit code of data.

7. The non-transitory computer readable storage medium of claim 6, wherein the n-bit code of data is a 3-bit code of data, and wherein, to move one of the encoding dots, the processor is to move the encoding dot in one of eight directions relative to the default position to encode the 3-bit code of data.

8. The non-transitory computer readable storage medium of claim 7, wherein the eight directions include of 0°, 45°, 90°, 135°, 180°, 225°, 270°, and 315°, and each of the eight directions corresponds to one of eight numbers of a 3-bit code.

9. The non-transitory computer readable storage medium of claim 6, wherein to move one of the encoding dots by a predetermined amount, the processor is to move the encoding dot by ⅓ of a pixel in the predetermined direction to encode the n-bit code data.

10. The non-transitory computer readable storage medium of claim 6, wherein the instructions further cause the processor to:

record, in a dot map identifier, locations of the reference dots within the arrangement of dots, locations of the encoding dots within the arrangement of dots, and a location of the encoding dot encoding the n-bit code of data.

11. A non-transitory computer readable storage medium storing instructions that when executed by a processor cause the processor to decode data from a security feature comprising an arrangement of dots, wherein, to decode data from the security feature, the instructions cause the processor to:

obtain an image of the arrangement of dots;

determine, within the arrangement of dots, locations of reference dots and a location of an encoding dot used to encode an n-bit code;

determine, based on an analysis of the encoding dot, a direction in which the encoding dot was moved relative to a default position of the encoding dot; and determine, based on the determined direction, the n-bit code encoded by the encoding dot.

12. The non-transitory computer readable storage medium of claim 11, wherein the instructions further cause the processor to:

identify an orientation feature on the obtained image;

identify an orientation of the arrangement of dots based on the identified orientation feature; and subsequent to identifying the orientation of the arrangement of dots, determine the direction in which the encoding dot was moved relative to the default position.

13. The non-transitory computer readable storage medium of claim 11, wherein the instructions further cause the processor to:

identify a dot map from the obtained image; and obtain, using the identified dot map, data relating to the locations of the reference dots within the arrangement of dots and the location of the encoding dot used to encode the n-bit code.

14. The non-transitory computer readable storage medium of claim 11, wherein to determine the direction in which the encoding dot was moved, the processor is to determine the default position of the encoding dot with reference to one of the reference dots.

15. The non-transitory computer readable storage medium of claim 11, wherein to determine the direction in which the encoding dot was moved, the processor is to determine one of eight directions that the encoding dot was moved relative to the default position, wherein the eight directions include 0°, 45°, 90°, 135°, 180°, 225°, 270°, and 315° relative to the default position, and each of the eight directions corresponds to one of eight numbers of a 3-bit code.

* * * * *

UNITED STATES PATENT AND TRADEMARK OFFICE
CERTIFICATE OF CORRECTION

PATENT NO. : 10,114,998 B2
APPLICATION NO. : 14/994677
DATED : October 30, 2018
INVENTOR(S) : Gideon Amir et al.

It is certified that error appears in the above-identified patent and that said Letters Patent is hereby corrected as shown below:

On the Title Page

At item (72), the first inventor's name should be "Gideon" instead of "Gideo".

On the 2nd page, at item (56), the other publication URL address should read "http://delivery.acm.org/10.1145/1970000/1966953/p306-molloy.pdf?ip=203.8.109.15&acc=ACTI" instead of "http://delivery.acm.org/10.1145/1970000/1966953/p306-molloy.pdf?ip=203.8.109.15&aco=ACTI".

In the Specification

On the Column 1, Line 46, "FIGS 5A-B" should read "FIGS 5A-5B".

On the Column 1, Line 58, "method" should read "method of".

On the Column 6, Line 48, "302" should read "1302".

Signed and Sealed this
Twentieth Day of August, 2019

Andrei Iancu
*Director of the United States Patent and Trademark Office*